United States Patent
Kawakami

(10) Patent No.: US 8,201,477 B2
(45) Date of Patent: Jun. 19, 2012

(54) BICYCLE COMPONENT OPERATING DEVICE

(75) Inventor: Tatsuya Kawakami, Sakai (JP)

(73) Assignee: Shimano Inc., Osaka (JP)

( * ) Notice: Subject to any disclaimer, the term of this patent is extended or adjusted under 35 U.S.C. 154(b) by 278 days.

(21) Appl. No.: 12/430,196

(22) Filed: Apr. 27, 2009

(65) Prior Publication Data
US 2010/0269623 A1    Oct. 28, 2010

(51) Int. Cl.
*F16C 1/10* (2006.01)
(52) U.S. Cl. ........................................ 74/502.2
(58) Field of Classification Search ............. 74/501.6, 74/502.2
See application file for complete search history.

(56) References Cited

U.S. PATENT DOCUMENTS

| | | | |
|---|---|---|---|
| 2,560,154 | A | 7/1951 | Brown |
| 6,216,078 | B1 | 4/2001 | Jinbo et al. |
| 6,862,948 | B1 * | 3/2005 | Calendrille, Jr. ............ 74/502.2 |
| 2007/0137384 | A1 * | 6/2007 | Kawakami ..................... 74/501.6 |
| 2009/0031846 | A1 | 2/2009 | Dal Pra' et al. |

FOREIGN PATENT DOCUMENTS
GB    786426    11/1957

OTHER PUBLICATIONS
European Search Report of corresponding EP Application No. 10 00 3268.9 dated Apr. 6, 2011.

* cited by examiner

*Primary Examiner* — Vicky Johnson
(74) *Attorney, Agent, or Firm* — Global IP Counselors, LLP

(57) ABSTRACT

A bicycle component operating device is basically provided with a rider operating member, a ratchet member, a positioning pawl and a winding pawl. The ratchet member is rotatably mounted about a pivot axis. The positioning pawl prevents rotation of the ratchet member in a releasing direction when the positioning pawl is in a holding position. The positioning pawl releases the ratchet member for rotation in the releasing direction in response to a releasing operation of the rider operating member. The winding pawl rotates the ratchet member in a winding direction in response to a winding operation of the rider operating member. The winding pawl contacts the positioning pawl and moves the positioning pawl radially outward relative to the pivot axis as the winding pawl moves radially outward relative to the pivot axis in response to the releasing operation.

22 Claims, 12 Drawing Sheets

BICYCLE COMPONENT OPERATING DEVICE

BACKGROUND OF THE INVENTION

1. Field of the Invention

This invention generally relates to a bicycle component operating device for operating a bicycle component.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets or gears. The sprockets or gears are usually coupled to the front crank and the rear wheel such that a pedaling force from the rider is transferred to the rear wheel via the chain.

Generally speaking, a typical derailleur basically includes a base member, a pair of link members and a movable member with a chain guide. In the case of a rear derailleur, the chain guide is typically pivotally mounted to the movable member and includes a chain cage with a guide pulley and a tension pulley. In either case, the link members of the front or rear derailleur are pivotally coupled between the base member and the movable member to form a four bar parallelogram linkage. A shift cable is usually coupled between the base member and one of the link members to move the chain guide laterally with respect to the center plane of the bicycle. Thus, an inner wire of the cable is pulled to move the chain guide in a first lateral direction with respect to the center plane of the bicycle, and released to move the chain guide in a second lateral direction with respect to the center plane of the bicycle. Some cable operated shifters use one or more levers to rotate a wire takeup member for winding and releasing the inner wire that operates the derailleur. In many cases, the inner wire is wrapped or unwrapped about a peripheral edge of the wire takeup member.

SUMMARY OF THE INVENTION

One object of the present invention is to provide a bicycle component operating device that is relatively simple and easy to manufacture.

The foregoing object can basically be attained by providing a bicycle component operating device that comprises a base member, a rider operating member, a ratchet member, a positioning pawl and a winding pawl. The rider operating member is movably mounted with respect to the base member. The ratchet member is rotatably mounted with respect to the base member about a pivot axis. The positioning pawl is movably mounted with respect to the base member between a holding position and a releasing position. The positioning pawl prevents rotation of the ratchet member in a releasing direction about the pivot axis when the positioning pawl is in the holding position. The positioning pawl releases the ratchet member for rotation in the releasing direction when the positioning pawl is in the releasing position. The winding pawl is movably mounted with respect to the base member. The winding pawl rotated the ratchet member in a winding direction that is opposite to the releasing direction about the pivot axis when the winding pawl is moved with respect to the base member in response to a winding operation of the rider operating member. The winding pawl contacts the positioning pawl and moves the positioning pawl radially outward relative to the pivot axis as the winding pawl moves radially outward relative to the pivot axis in response to a releasing operation of the rider operating member.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
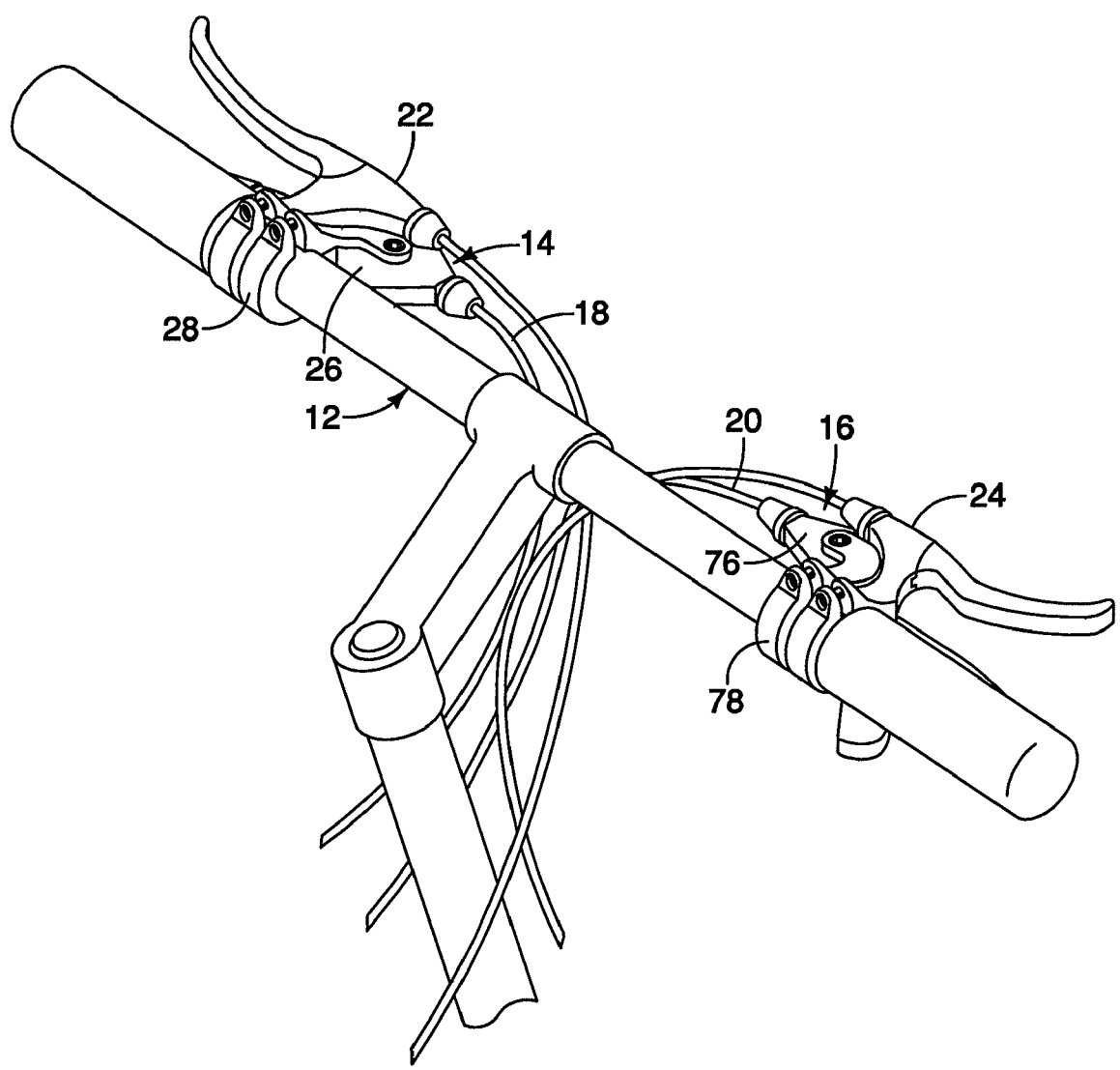
FIG. 1 is a perspective view of a bicycle handlebar of a bicycle having a pair of shifters in accordance with one embodiment.
Figure 2:
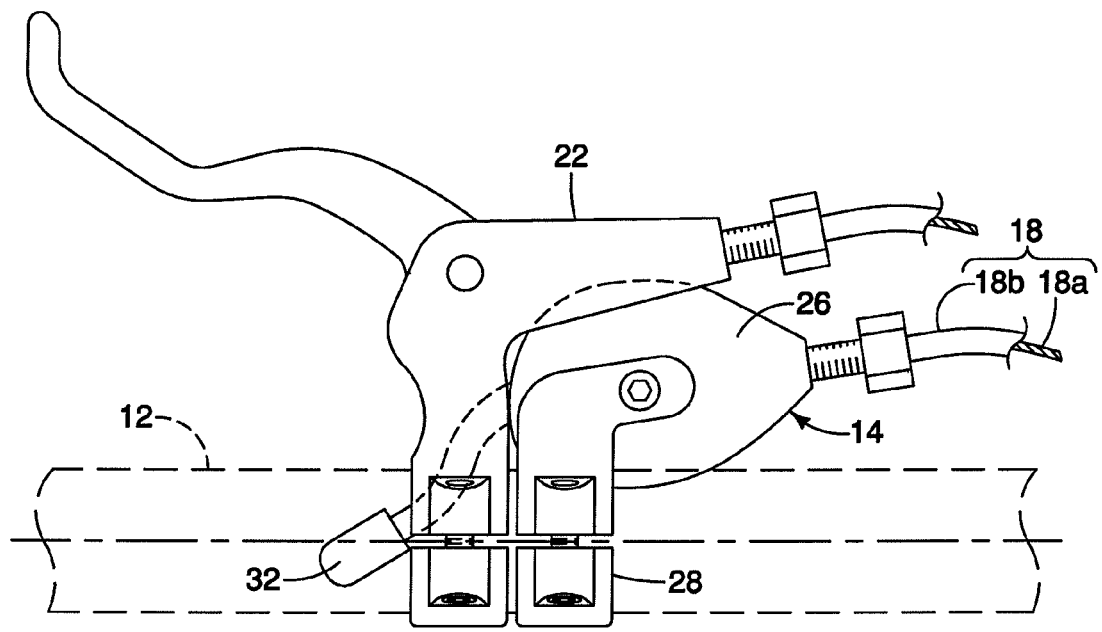
FIG. 2 is a top plan view of the front or left hand shifter illustrated in FIG. 1.
Figure 3:
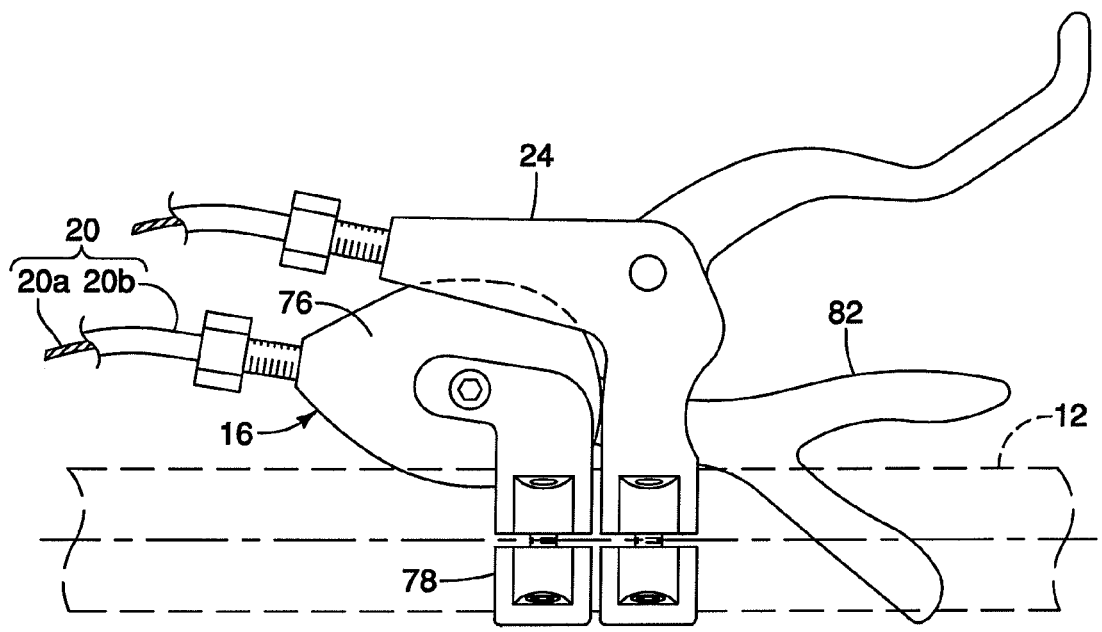
FIG. 3 is a top plan view of the rear or right hand shifter illustrated in FIG. 1.

Referring initially to FIGS. 1 to 3, a bicycle handlebar 12 is illustrated with a pair of bicycle component operating devices 14 and 16 in accordance with one embodiment. In the illustrated embodiment, the bicycle component operating devices 14 and 16 constitute cable operating mechanisms or shifters that are preferably used for shifting gears of a bicycle that is equipped with a various conventional components, including, but not limited to front and rear derailleurs (not shown). As seen in FIGS. 1 and 2, the bicycle component operating device 14 is a left hand side control device operated by the rider's left hand for shifting a front derailleur via a front shift operating cable 18. As seen in FIGS. 1 and 3, the bicycle component operating device 16 is a right hand side control device operated by the rider's right hand for shifting a rear derailleur via a rear shift operating cable 20. As seen in FIGS. 2 and 3, the component operating devices 14 and 16 are mounted on the handlebar 12 closely adjacent to brake levers 22 and 24, respectively. Alternatively, the bicycle component operating devices 14 and 16 can be mounted on opposite side of the handlebar 12 as needed and/or desired. Of course, it will be apparent to those skilled in the art from this disclosure that the bicycle component operating devices 14 and 16 can be used to operate other bicycle components as needed and/or desired.

The shift operating cables 18 and 20 are conventional Bowden cables. In particular, the shift operating cable 18 includes an inner wire 18a with an outer casing 18b covering the inner wire 18a, while the shift operating cable 20 includes an inner wire 20a with an outer casing 20b covering the inner wire 20a. A front derailleur can be moved between a plurality of different gear positions by operation of the bicycle component operating device 14, which selectively pulls or releases the inner wire 18a of the shift operating cable 18. Similarly, a rear derailleur can be moved between a plurality of different gear positions by operation of the bicycle component operating device 16, which selectively pulls or releases the inner wire 20a of the shift operating cable 20.

Referring now to FIGS. 2 and 4 to 11, the bicycle component operating device 14 will now be described in more detail. While the bicycle component operating device 14 in the illustrated embodiment has only two shift positions, it will be apparent to those skilled in the art from this disclosure that the bicycle component operating device 14 can be modified to have more than two shift positions, if needed and/or desired. Preferably, as seen in FIG. 2, the bicycle component operating device 14 includes a housing 26 for covering the internal parts and a handlebar clamp 28 for securing the bicycle component operating device 14 to the handlebar 12. The handlebar clamp 28 is preferably made of, for example, metal and configured to be fastened to the handlebar 12 by tightening a bolt. As seen FIG. 4, the bicycle component operating device 14 is basically provided with a base member 30, a rider operating member 32, a ratchet member 34, a wire takeup member 36, a positioning pawl 38 and a winding pawl 40. The wire takeup member 36 is fixedly coupled to the ratchet member 34 so that the ratchet member 34 and the wire takeup member 36 move together about a main pivot or rotational axis A in response to movement of the rider operating member 32 as explained below.

The housing 26 is snap-fitted to the base member 30, with a rider operation portion projecting out of the housing 26. In the illustrated embodiment, the bicycle component operating device 14 has two shift positions, with the rider operating member 32 being movably mounted with respect to the base member 30 to perform both an inner wire releasing operation that releases the inner wire 18a and an inner wire winding operation that pulls the inner wire 18a. The housing 26 can be constructed of a hard plastic or metal as needed and/or desired. The particular construction of the housing 26 is unimportant, and thus, will not be described and/or illustrated in detail herein.

Figure 4:
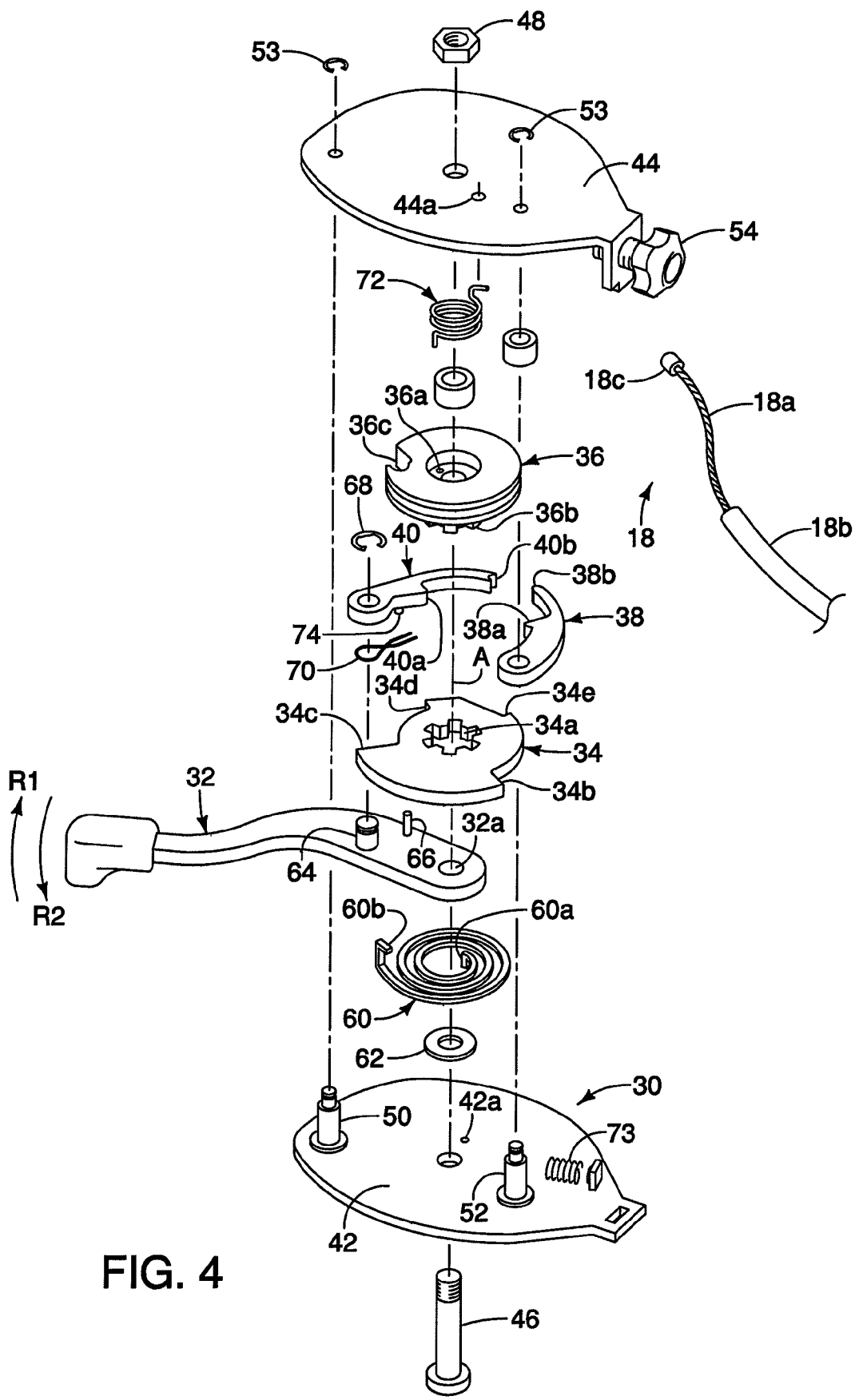
FIG. 4 is an exploded perspective view of the front hand shifter illustrated in FIGS. 1 and 2.

As seen in FIG. 4, the base member 30 basically includes a lower support plate 42, an upper support plate 44, a main support shaft 46 extending between the support plates 42 and 44, and a nut 48. The housing 26, the handlebar clamp 28 and the support plates 42 and 44 basically constitute a support or fixed member of the bicycle component operating device 14. The support plates 42 and 44 are preferably rigid metal plates. The support plates 42 and 44 are secured together by the main support shaft 46, which is preferably a bolt with the nut 48 threaded on its upper end.

The lower support plate 42 has a stop pin 50 fixed (e.g., riveted) thereto and a pivot pin 52 fixed (e.g., riveted) thereto. The stop pin 50 limits movement of the rider operating member 32 in a return direction as discussed below. The pivot pin 52 pivotally supports the positioning pawl 38 between the support plates 42 and 44. The upper ends of the pins 50 and 52 have reduces diameters for extending through holes in the upper support plate 44, and have grooves for receiving C-shaped retaining clips 53. Thus, the pins 50 and 52 aid in maintaining the support plates 42 and 44 at the appropriate spacing. The upper support plate 44 is preferably provided with a cable adjusting nut 54 for receiving the shift operating cable 18. The cable adjusting nut 54 guides the inner wire 18a of the shift operating cable 18 to the wire takeup member 36, such that a nipple portion 18c of the shift operating cable 18 is attached to the wire takeup member 36 in a conventional manner. The cable adjusting nut 54 is a conventional structure, and thus, it will not be discussed and/or illustrated in detail.

Preferably, the main support shaft 46 extends perpendicular to the support plates 42 and 44. The main support shaft 46 defines the main pivot or rotational axis A of the rider operating member 32, the ratchet member 34 and the wire takeup member 36. In other words, the rider operating member 32, the ratchet member 34 and the wire takeup member 36 are all movably mounted with respect to the base member 30 on a single coincident axis corresponding to the pivot axis A.

As seen in FIGS. 5 to 12, the rider operating member 32 is pivotally mounted with respect to the base member 30 about the pivot axis A of the rider operating member 32, the ratchet member 34 and the wire takeup member 36. The rider operating member 32 is pivoted with respect to the base member 30 to move in a first rotational direction R1 (i.e., an inner wire winding direction) to perform both the inner wire winding operation and the inner wire releasing operation. The rider operating member 32 is a trigger type lever such that it is biased in a second rotational direction R2 (i.e., an inner wire releasing direction) by a return spring 60. The return spring 60 constitutes a biasing element that has one end 60a disposed in a hole 42a of the lower support plate 42 and a second end 60b looped on the rider operating member 32. Thus, the return spring 60 biases the rider operating member 32 towards one of the rest positions (FIGS. 5 and 9) as discussed below. A washer 62 is provided on the upper surface of the lower support plate 42 to prevent the return spring 60 from being squeezed when the support plates 42 and 44 are fasten together by the main support shaft 46 and the nut 48.

As seen in FIG. 4, the rider operating member 32 has a hole 32a at its inner end for receiving the main support shaft 46 so that the rider operating member 32 is pivotally supported on the main support shaft 46. The rider operating member 32 also has a pivot pin 64 and a spring abutment 66. The pivot pin 64 pivotally supports the winding pawl 40 thereon. In particular, the pivot pin 64 has its lower end fixed (e.g., riveted) to the rider operating member 32, and has its upper end provided with a groove to receive a clip 68. A return spring 70 has a coiled portion mounted on the pivot pin 64 and leg portions engaged with opposite sides of the spring abutment 66 for biasing the winding pawl 40 to a rest or equilibrium position as explained later. Thus, the return spring 70 constitutes a biasing element for the winding pawl 40.

Figure 5:
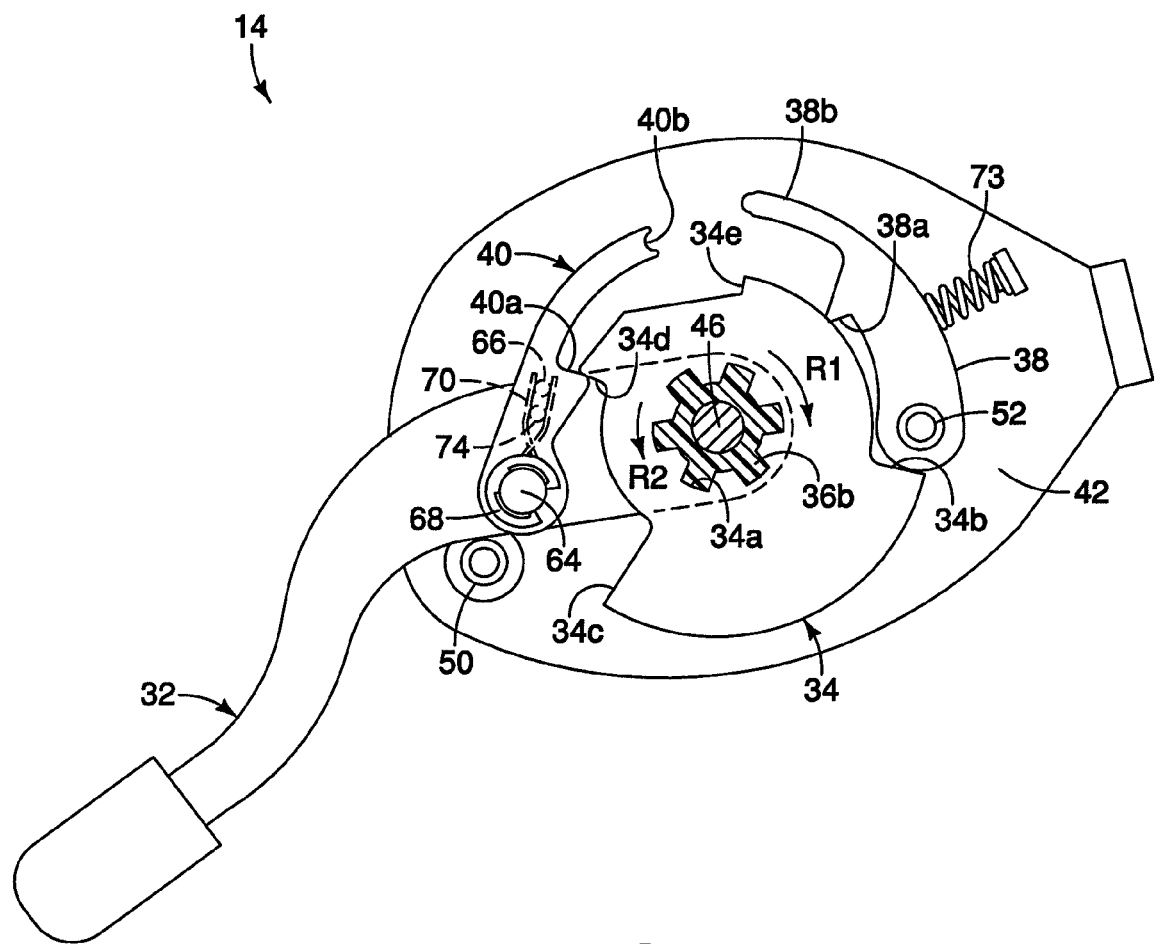
FIG. 5 is a top plan view of selected parts of the front hand shifter with the rider operating member or lever in a rest position and the ratchet member in a first shift position.

When the rider operating member 32 is in a first rest position, as seen in FIG. 5, the ratchet member 34 is held in a first shift position by the positioning pawl 38 and the winding pawl 40. However, when the rider operating member 32 is pivoted in the first rotational direction R1 from the first rest position, as seen in FIG. 5, the winding pawl 40 rotates the ratchet member 34 about the pivot axis A in the first rotational direction R1. Since the wire takeup member 36 is fixed to the ratchet member 34, the wire takeup member 36 rotates with the ratchet member 34 as the rider operating member 32 is pivoted in the first rotational direction R1 from the first rest position, as seen in FIG. 5.

Figure 6:
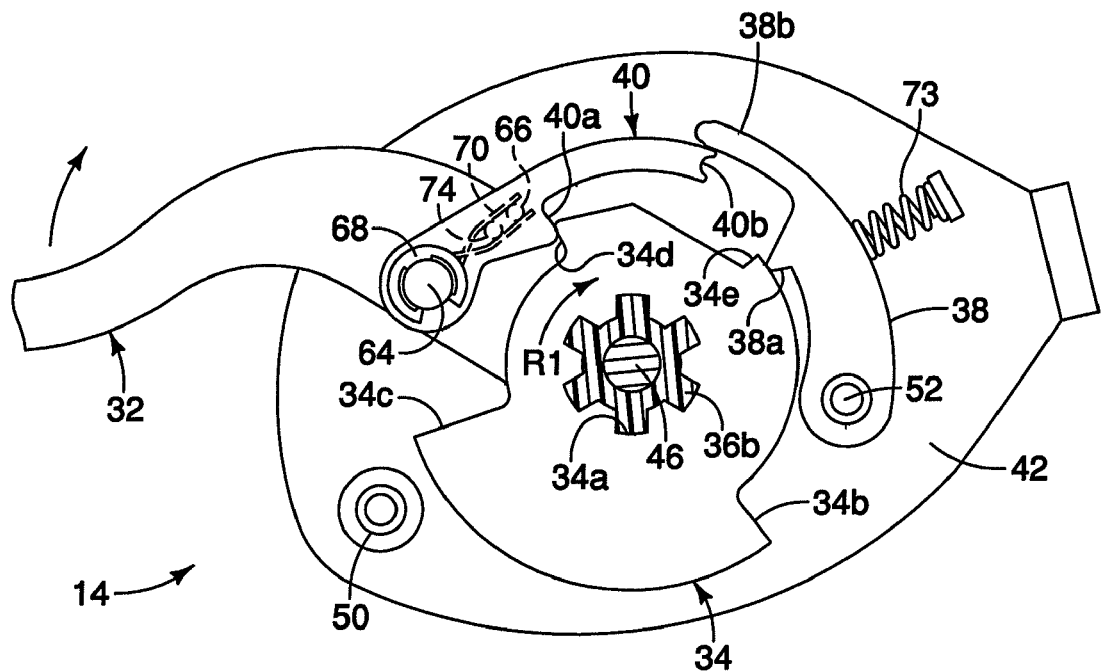
FIG. 6 is a top plan view of selected parts of the front hand shifter with the rider operating member rotated to an intermediate stroke position during an inner wire winding operation from the first shift position to the second shift position.
Figure 7:
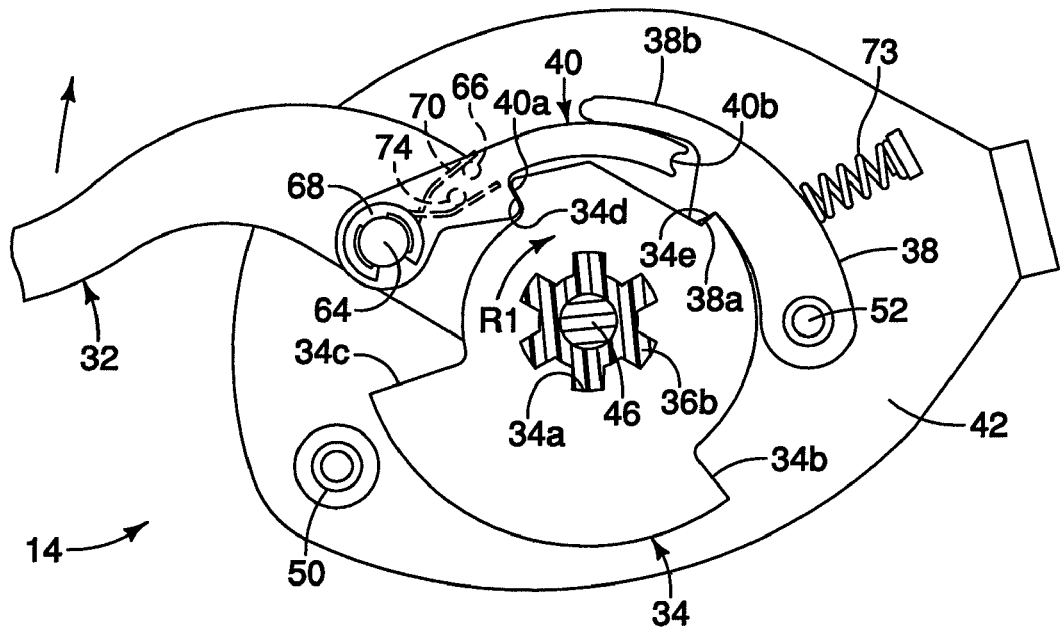
FIG. 7 is a top plan view of selected parts of the front hand shifter with the rider operating member rotated to an end stroke position during an inner wire winding operation from the first shift position to the second shift position.
Figure 8:
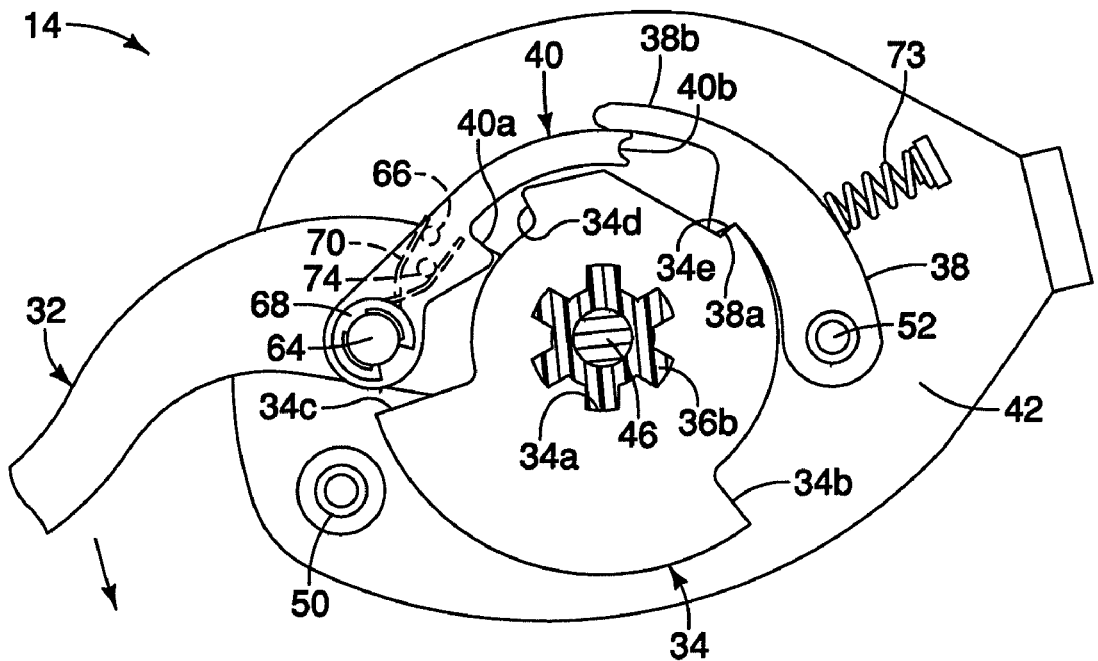
FIG. 8 is a top plan view of selected parts of the front hand shifter with the rider operating member returning from the end stroke position illustrated in FIG. 7 after performing an inner wire winding operation such that the ratchet member is in the second shift position.
Figure 9:
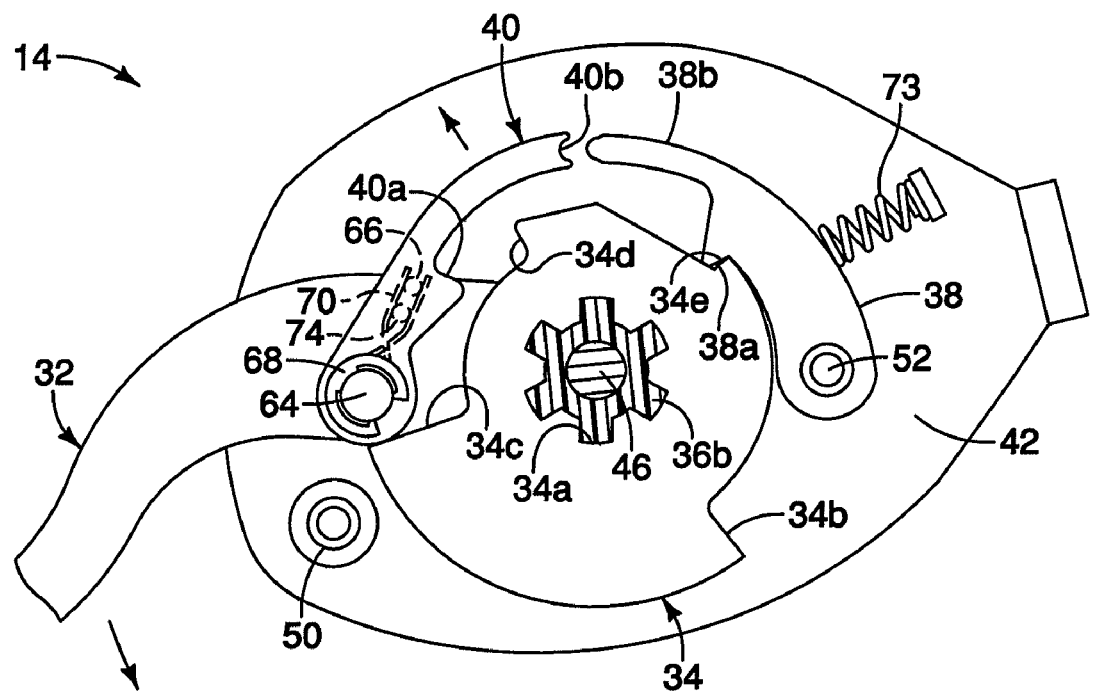
FIG. 9 is a top plan view of selected parts of the front hand shifter with the rider operating member in the rest position with the ratchet member in the second shift position.

As the rider operating member 32 is pivoted in the first rotational direction R1 from the first rest position, as seen in FIG. 5, the ratchet member 34 rotates the wire takeup member 36 and the winding pawl 40 contacts the positioning pawl 38, which starts to move the winding pawl 40 radially inward with respect to the pivot axis A, as seen in FIG. 6. As seen in FIG. 6, the rider operating member 32 is in an intermediate stroke position, in which the ratchet member 34 has not yet reached the second shift position (see, FIGS. 7 to 10). When the rider operating member 32 is pivoted farther in the first rotational direction R1 from the intermediate stroke position, as seen in FIG. 6, to an end stroke position of the rider operating member 32, as seen in FIG. 7, the positioning pawl 38 moves radially inward with respect to the pivot axis A to latch on the ratchet member 34. Once the positioning pawl 38 latches on the ratchet member 34, the ratchet member 34 is prevented from rotation in a second rotational direction R2, which is opposite the first rotational direction R1, as seen in FIGS. 8 to 9. The rider operating member 32 is trigger type lever such that it is biased in the second rotational direction R2, and moves to one of the rest positions (FIGS. 5 and 9) when the rider operating member 32 is released. When the rider operating member 32 is released after an inner wire winding operation, the rider operating member 32 contacts the ratchet member 34, as seen in FIG. 9, to stop rotation of the rider operating member 32 in the second rotational direction R2. However, when the rider operating member 32 is released after an inner wire releasing operation, the rider operating member 32 contacts the stop pin 50, as seen in FIG. 5, to stop rotation of the rider operating member 32 in the second rotational direction R2. Thus, the rest position of the rider operating member 32 is slightly different depending on the shift position of the ratchet member 34.

Figure 10:
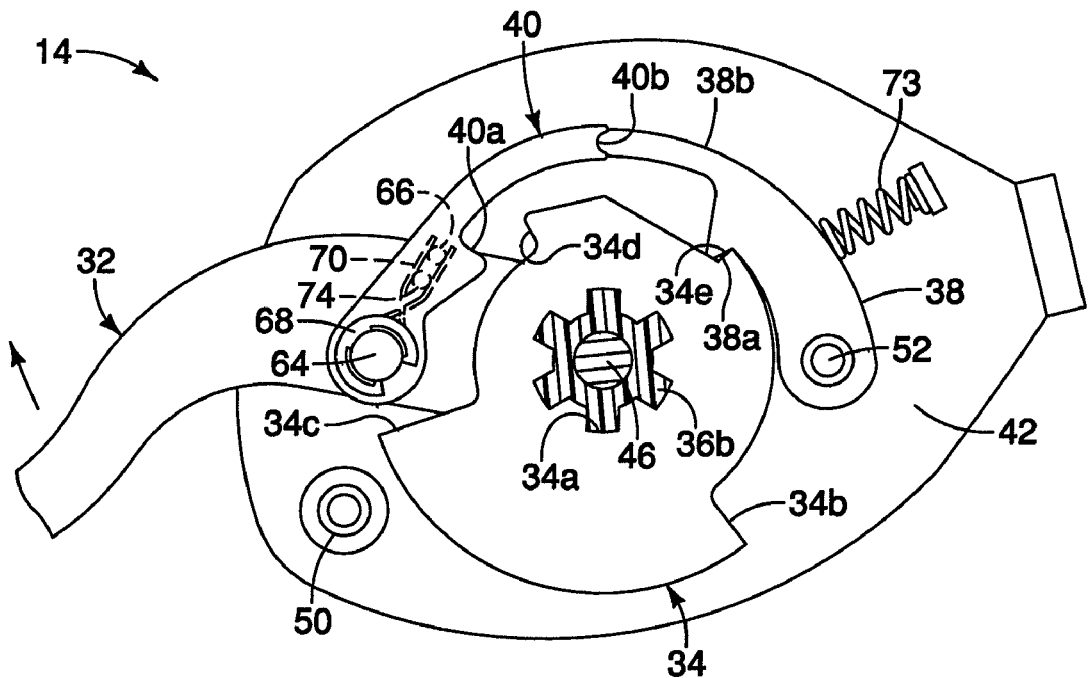
FIG. 10 is a top plan view of selected parts of the front hand shifter with the rider operating member rotated to an intermediate stroke position during an inner wire releasing operation from the second shift position to the first shift position.
Figure 11:
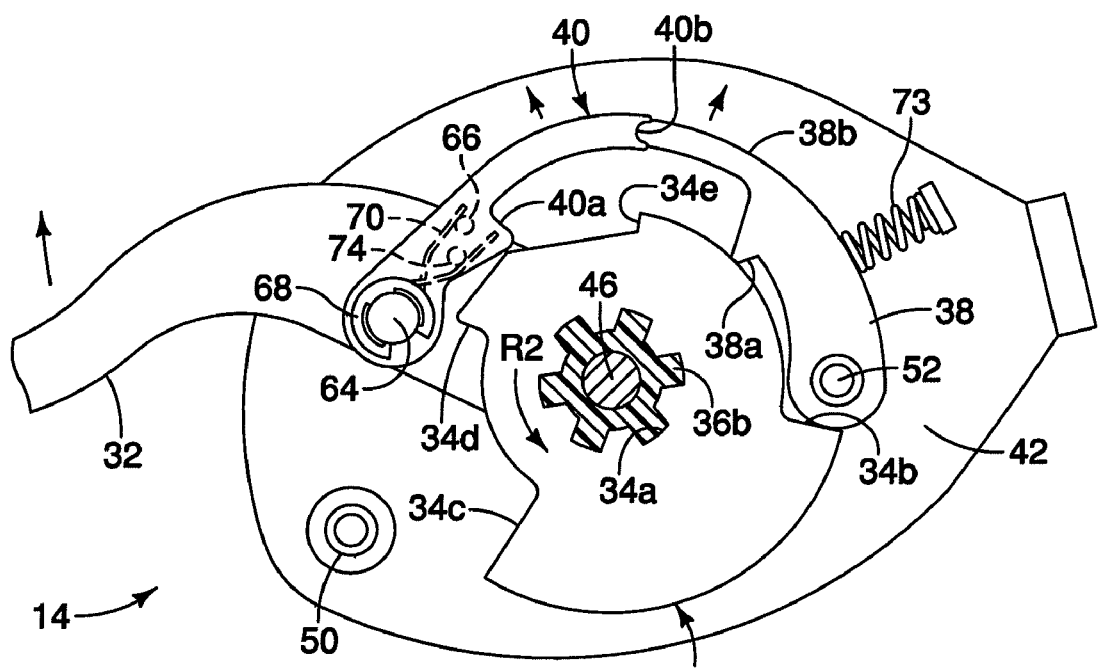
FIG. 11 is a top plan view of selected parts of the front hand shifter with the rider operating member rotated to an end stroke position during an inner wire releasing operation from the second shift position to the first shift position.

Referring to FIGS. 9 to 10, an inner wire releasing operation is illustrated. Here, in FIG. 9, the rider operating member 32 is in the rest position with the ratchet member 34 in the second shift position. Thus, with the ratchet member 34 in the second shift position, the positioning pawl 38 is disposed in radially inward with respect to the pivot axis A as compared to when the ratchet member 34 is in the first shift position. Thus, when the rider operating member 32 is pivoted in the first rotational direction R1 from the rest position, as seen in FIG. 9, to an intermediate stroke position of the rider operating member 32, as seen in FIG. 10, the winding pawl 40 contacts the positioning pawl 38. When the winding pawl 40 contacts the positioning pawl 38 in the manner as shown in FIG. 10, further movement of the rider operating member 32 in the first rotational direction R1 results in both the winding pawl 40 and the positioning pawl 38 being moved radially outward with respect to the pivot axis A, as seen in FIG. 11. Once the rider operating member 32 has been pivoted in the first rotational direction R1 from the rest position, as seen in FIG. 9, to the end stroke position, as seen in FIG. 11, the positioning pawl 38 unlatches from the ratchet member 34. Thus, this unlatching of the positioning pawl 38 from the ratchet member 34 results in the ratchet member 34 rotating from the second shift position to the first shift position. Now, when the rider operating member 32 is released after performing this inner wire releasing operation, the rider operating member 32 returns to the rest position and contacts the stop pin 50, as seen in FIG. 5, to stop rotation of the rider operating member 32 in the second rotational direction R2.

Turning now to the structure of the ratchet member 34. The ratchet member 34 is rotatably mounted with respect to the base member 30 about the pivot axis A. Preferably, as seen in FIG. 4, the ratchet member 34 is biased in the second rotational direction R2 by a biasing element 72 that is operatively disposed between the wire takeup member 36 and the upper support plate 44. In particular, since the ratchet member 34 and the wire takeup member 36 are coupled together to rotate as a unit, the biasing force of the biasing element 72 is transmitted from the wire takeup member 36 to the ratchet member 34. The biasing element 72 has a first end disposed in a hole 44a in the upper support plate 44 and a second end disposed in a hole 36a in the wire takeup member 36. The biasing element 72 is preloaded to urge the ratchet member 34 and the wire takeup member 36 in the second rotational direction R2.

In the illustrated embodiment, the ratchet member 34 includes a mounting hole 34a, a first rotational stop 34b, a second rotational stop 34c, a winding abutment 34d and a positioning abutment 34e. The mounting hole 34a is a non-circular hole that mates with a corresponding projection 36b of the wire takeup member 36 so that the ratchet member 34 and the wire takeup member 36 move together as a unit. The first and second rotational stops 34b and 34c are formed on the peripheral edge of the ratchet member 34 at two peripheral spaced locations. The first and second rotational stops 34b and 34c face in opposite rotational directions with respect to the pivot axis A. The first rotational stop 34b contacts the positioning pawl 38 to stop rotational movement of the ratchet member 34 in the second rotational (releasing) direction R2 against the urging force of the biasing element 72 as seen in FIG. 5. The second rotational stop 34c contacts the winding pawl 40 to stop rotational movement of the rider operating member 32 in the second rotational (releasing) direction R2 against the urging force of the return spring 60 as seen in FIG. 9. The winding abutment 34d and the positioning abutment 34e are also formed on the peripheral edge of the ratchet member 34 at two peripheral spaced locations. The winding abutment 34d and the positioning abutment 34e face in the same rotational directions with respect to the pivot axis A. The winding abutment 34d is engaged by the winding pawl 40 in response to a winding operation of the rider operating member 32 for rotating the ratchet member 34 in the first rotational direction R1 (i.e., an inner wire winding direction) about the pivot axis A, as seen in FIGS. 6 and 7. Thus, the winding abutment 34d is engaged by the winding pawl 40 during the inner wire winding operation. The positioning abutment 34e is engaged by the positioning pawl 38 to hold the ratchet member 34 in the second shift position, as seen in FIG. 9. Thus, the positioning abutment 34e is engaged by the positioning pawl 38 when the positioning pawl 38 is in a holding position Turning now to the structure of the wire takeup member 36. The wire takeup member 36 is a hard plastic member that is attached to the inner wire 18a of the shift operating cable 18 for pull and releasing the inner wire 18a to perform a shifting operation. The wire takeup member 36 has a wire attachment structure 36c for attaching the nipple portion 18c of the shift operating cable 18 thereto. As seen in FIG. 4, the wire takeup member 36 is fixedly coupled to the ratchet member 34 so that the ratchet member 34 and the wire takeup member 36 move together about the pivot axis A. In particular, as mentioned above, the projection 36b of the wire takeup member 36 mates with the mounting hole 34a so that the ratchet member 34 and the wire takeup member 36 move together as a unit. Thus, as the wire takeup member 36 rotates the inner wire 18a of the shift operating cable 18 is wound or unwound on the peripheral edge of the wire takeup member 36.

Turning now to the structure of the positioning pawl 38. As mentioned above, the positioning pawl 38 is pivotally mounted on the pivot pin 52 of the lower support plate 42. Thus, the positioning pawl 38 is pivotally mounted with respect to the base member 30 about a pivot axis that is offset from the pivot axis A of the ratchet member 34. As seen in FIGS. 9 to 11, the positioning pawl 38 is movably mounted with respect to the base member 30 from a holding position (FIGS. 9 and 10) to a releasing position (FIG. 11) in response to an inner wire releasing operation of the rider operating member 32. A compression spring 73 is disposed between a tab of the lower support 42 and the positioning pawl 38 for biasing the positioning pawl 38 against the peripheral edge of the ratchet member 34. The spring 73 has a very strong urging force as compared to the return spring 70 of the winding pawl 40.

The positioning pawl 38 has a positioning tooth or abutment 38a that engages the positioning abutment 34e of the ratchet member 34 when the ratchet member 34 is in the second shift position and the positioning pawl 38 is the holding position (FIGS. 9 and 10). The positioning pawl 38 prevents rotation of the ratchet member 34 in the second rotational direction R2 (i.e., the inner wire releasing direction) about the pivot axis A when the positioning tooth 38a of the positioning pawl 38 engages the positioning abutment 34e of the ratchet member 34 (i.e., the positioning pawl 38 is in the holding position). The positioning pawl 38 releases the ratchet member 34 for rotation in the second rotational direction R2 (i.e., the inner wire releasing direction) when the positioning tooth 38a of the positioning pawl 38 disengages the positioning abutment 34e of the ratchet member 34 (i.e., the positioning pawl 38 is in the releasing position).

The positioning pawl 38 also has an engagement abutment 38b that contacts the winding pawl 40 in response to an inner wire winding operation of the rider operating member 32 such that the engagement abutment 38b moves the winding pawl 40 radially inward relative to the pivot axis A as seen in FIGS. 6 and 7. In this way, the winding abutment 34d is securely engaged by the winding pawl 40 during the inner wire winding operation. A tip or free end of the engagement abutment 38b also contacts the winding pawl 40 in response to an inner wire releasing operation of the rider operating member 32 such that the positioning pawl 38 and the winding pawl 40 both move radially outward relative to the pivot axis A. In this way, the positioning tooth 38a of the positioning pawl 38 is disengaged the positioning abutment 34e of the ratchet member 34 and the winding pawl 40 moves out of an engagement path of the winding abutment 34d of the ratchet member 34 during the inner wire releasing operation.

Turning now to the structure of the winding pawl 40. As mentioned above, the winding pawl 40 is pivotally mounted on the pivot pin 64 of the rider operating member 32. Thus, the winding pawl 40 is pivotally mounted with respect to the base member 30 about a pivot axis that is offset from the pivot axis A of the ratchet member 34. The winding pawl 40 has a winding abutment or tooth 40a and an engagement abutment 40b. The winding tooth 40a engages the winding abutment 34d of the ratchet member 34 to rotate the ratchet member 34 in the first rotational direction R1 (i.e., an inner wire winding direction) about the pivot axis A when the winding pawl 40 is moved with respect to the base member 30 in response to an inner wire winding operation of the rider operating member 32. The engagement abutment 40b contacts the tip or free end of the engagement abutment 38b of the positioning pawl 38. This contact between the engagement abutment 40b of the winding pawl 40 and the tip of the engagement abutment 38b of the positioning pawl 38 moves the positioning pawl 38 radially outward relative to the pivot axis A as the winding pawl 40 moves radially outward relative to the pivot axis A in response to an inner wire releasing operation of the rider operating member 32. Also this contact between the engagement abutment 40b of the winding pawl 40 and the tip of the engagement abutment 38b of the positioning pawl 38 disengages the positioning tooth 38a of the positioning pawl 38 from the positioning abutment 34e of the ratchet member 34 to perform the releasing operation when the rider operating member 32 is moved in the first rotational direction R1. In other words, once the positioning tooth 38a of the positioning pawl 38 is disengaged from the positioning abutment 34e of the ratchet member 34, the urging force of the biasing element 72 rotates the ratchet member 34 in the second rotational direction R2.

The winding pawl 40 is provided with a spring abutment 74 that engages the leg portions of the return spring 70. In particular, the leg portions of the return spring 70 engage opposite sides of the spring abutment 66 of the rider operating member 32 and the spring abutment 74 of the winding pawl 40 for biasing the winding pawl 40 to the rest or equilibrium position. From this rest or equilibrium position, the winding pawl 40 can pivot both outwardly (away) from the pivot axis A of the ratchet member 34 and inwardly towards the pivot axis A of the ratchet member 34. Thus, the return spring 70 urges the winding pawl 40 towards the rest or equilibrium position, when the winding pawl 40 is moved either outwardly or inwardly with respect to the pivot axis A of the ratchet member 34.

When the rider operating member 32 is moved in the first rotational direction R1 (i.e., an inner wire winding direction) to perform an inner wire winding operation, as seen in FIGS. 6 to 9, the winding pawl 40 contacts the engagement abutment 38b of the positioning pawl 38, which moves the winding pawl 40 inwardly towards the pivot axis A of the ratchet member 34. This inward movement of the winding pawl 40 causes the leg portions of the return spring 70 to be separate apart as seen in FIG. 7. Thus, when the rider operating member 32 is released from the end stroke position shown in FIG. 7, the leg portions of the return spring 70 will apply a restoring force on the spring abutment 74 of the winding pawl 40 so that the winding pawl 40 returned to the rest or equilibrium position.

When the rider operating member 32 is moved in the first rotational direction R1 to perform an inner wire releasing operation, as seen in FIGS. 10 and 11, the engagement abutment 40b of the winding pawl 40 contacts the tip or free end of the engagement abutment 38b of the positioning pawl 38. This contact between the winding pawl 40 and the tip of the engagement abutment 38b of the positioning pawl 38 moves the positioning pawl 38 radially outward relative to the pivot axis A as the winding pawl 40 moves radially outward relative to the pivot axis A in response to the inner wire releasing operation of the rider operating member 32. Also this contact between the engagement abutment 40b of the winding pawl 40 and the tip of the engagement abutment 38b of the positioning pawl 38 moves the positioning tooth 38a of the positioning pawl 38 out of engagement from the positioning abutment 34e of the ratchet member 34 to perform the releasing operation when the rider operating member 32 is moved in the first rotational direction R1.

Referring now to FIGS. 3 and 12 to 20, the bicycle component operating device 16 will now be described in more detail. Preferably, as seen FIG. 3, the bicycle component operating device 16 includes a housing 76 for covering the internal parts and a handlebar clamp 78 for securing the bicycle component operating device 16 to the handlebar 12. The handlebar clamp 78 is preferably made of, for example, metal and configured to be fastened to the handlebar 12 by tightening a bolt. As seen FIG. 12, the bicycle component operating device 16 is basically provided with a base member 80, a rider operating member 82, a ratchet member 84, a wire takeup member 86, a positioning pawl 88 and a winding pawl 90. The wire takeup member 86 is fixedly coupled to the ratchet member 84 so that the ratchet member 84 and the wire takeup member 86 move together about a main pivot or rotational axis B in response to movement of the rider operating member 82 as explained below.

The housing 76 is snap-fitted to the base member 80, with a rider operation portion projecting out of the housing 76. In the illustrated embodiment, the bicycle component operating device 16 has nine shift positions, with the rider operating member 82 being movably mounted with respect to the base member 80 to perform both an inner wire releasing operation that releases the inner wire 20a and an inner wire winding operation that pulls the inner wire 20a. The housing 76 can be constructed of a hard plastic or metal as needed and/or desired. The particular construction of the housing 76 is unimportant, and thus, will not be described and/or illustrated in detail herein.

Figure 12:
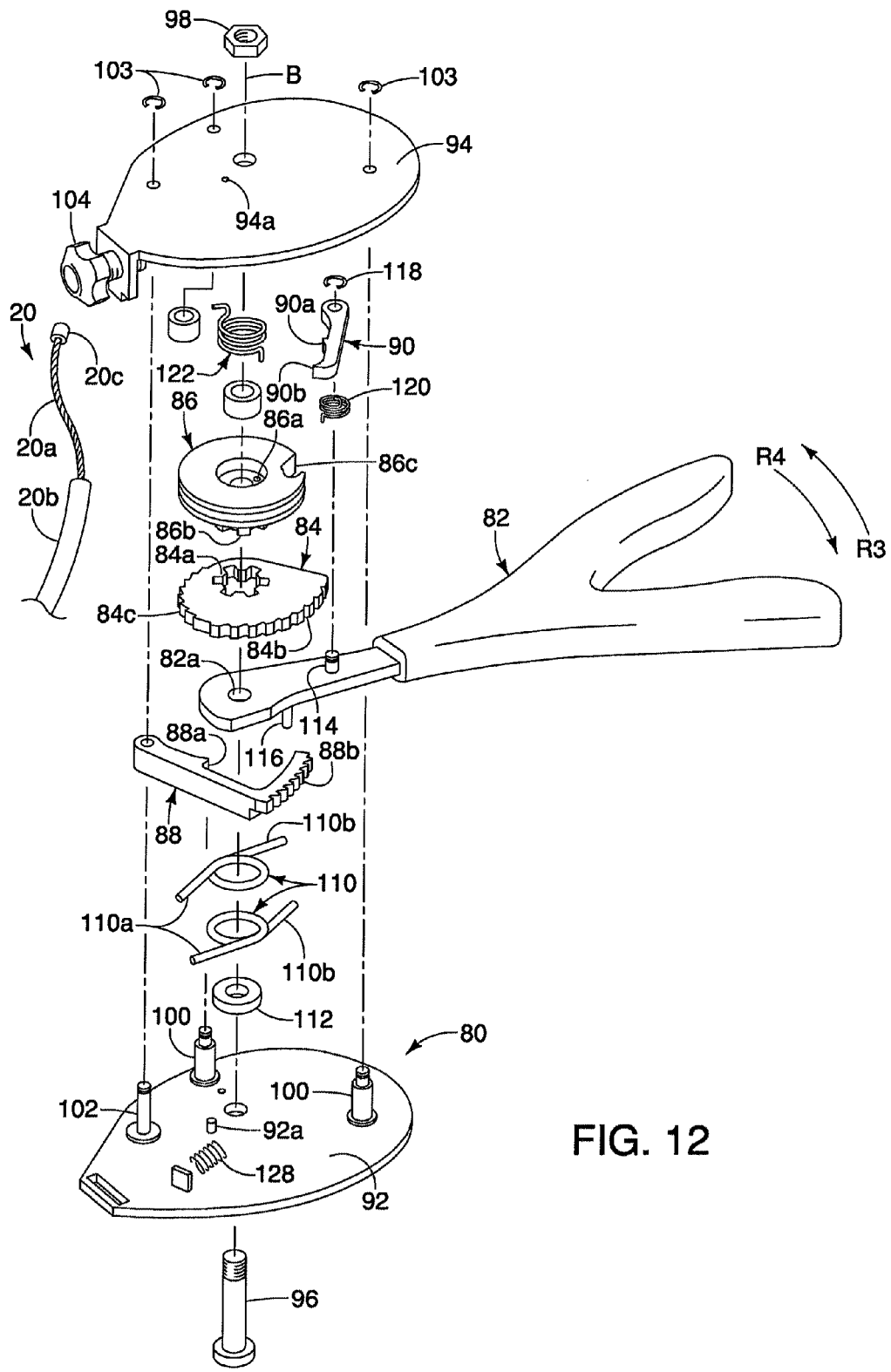
FIG. 12 is an exploded perspective view of the rear hand shifter illustrated in FIGS. 1 and 3.

As seen in FIG. 12, the base member 80 basically includes a lower support plate 92, an upper support plate 94, a main support shaft 96 extending between the support plates 92 and 94, and a nut 98. The housing 76, the handlebar clamp 78 and the support plates 92 and 94 basically constitute a support or fixed member of the bicycle component operating device 16. The support plates 92 and 94 are preferably rigid metal plates. The support plates 92 and 94 are secured together by the main support shaft 96, which is preferably a bolt with the nut 98 threaded on its upper end.

The lower support plate 92 has a pair of stop pins 100 fixed (e.g., riveted) thereto and a pivot pin 102 fixed (e.g., riveted) thereto. The stop pins 100 limit movement of the rider operating member 82 as discussed below. The pivot pin 102 pivotally supports the positioning pawl 88 between the support plates 92 and 94. The upper ends of the pins 100 and 102 have reduces diameters for extending through holes in the upper support plate 94, and have grooves for receiving C-shaped retaining clips 103. Thus, the pins 100 and 102 aid in maintaining the support plates 92 and 94 at the appropriate spacing. The upper support plate 94 is preferably provided with a cable adjusting nut 104 for receiving the shift operating cable 20. The cable adjusting nut 104 guides the inner wire 20a of the shift operating cable 20 to the wire takeup member 86, such that a nipple portion 20c of the shift operating cable 20 is attached to the wire takeup member 86 in a conventional manner. The cable adjusting nut 104 is a conventional structure, and thus, it will not be discussed and/or illustrated in detail.

Preferably, the main support shaft 96 extends perpendicular to the support plates 92 and 94. The main support shaft 96 defines the main pivot or rotational axis B of the rider operating member 82, the ratchet member 84 and the wire takeup member 86. In other words, the rider operating member 82, the ratchet member 84 and the wire takeup member 86 are all movably mounted with respect to the base member 80 on a single coincident axis corresponding to the pivot axis B.

Figure 13:
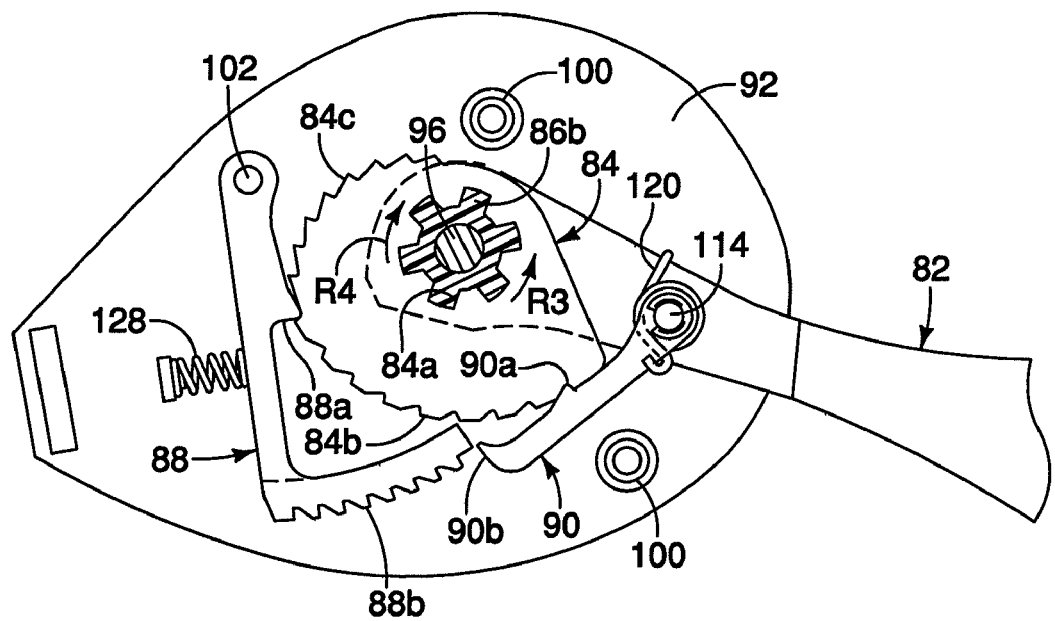
FIG. 13 is a top plan view of selected parts of the rear hand shifter with the rider operating member or lever in a rest position and the ratchet member being held in the first shift position by the positioning pawl.

As seen in FIGS. 13 to 18, the rider operating member 82 is pivotally mounted with respect to the base member 80 about the pivot axis B of the rider operating member 82, the ratchet member 84 and the wire takeup member 86. The rider operating member 82 is pivoted with respect to the base member 80 to move in a first rotational direction R3 (i.e., an inner wire winding direction) to perform both the inner wire winding operation and the inner wire releasing operation. The rider operating member 82 is a trigger type lever that can be pivoted in either the first rotational direction R3 or a second rotational direction R4 from a rest or equilibrium position (FIG. 13). The rider operating member 82 is biased to the rest or equilibrium position (FIG. 13) by a return springs 110.

The return springs 110 constitute a biasing element. Each of the return springs 110 has a first end 110a that contacts an abutment 92a of the lower support plate 92 and a second end 10b that contacts the rider operating member 82. Thus, the return springs 110 bias the rider operating member 82 towards one of the rest position (FIG. 13) as discussed below. A washer 112 is provided on the upper surface of the lower support plate 92 to prevent the return springs 110 from being squeezed when the support plates 92 and 94 are fasten together by the main support shaft 96 and the nut 98.

As seen in FIG. 12, the rider operating member 82 has a hole 82a at its inner end for receiving the main support shaft 96 so that the rider operating member 82 is pivotally supported on the main support shaft 96. The rider operating member 82 also has a pivot pin 114 and a spring abutment 116. The pivot pin 114 pivotally supports the winding pawl 90 thereon. In particular, the pivot pin 114 has its lower end fixed (e.g., riveted) to the rider operating member 82, and has its upper end provided with a groove to receive a clip 118. A biasing element 120 is provided on the pivot pin 114 for biasing the winding pawl 90 into engagement with the ratchet member 84. The biasing element 120 is torsion spring that has a coiled portion mounted on the pivot pin 114. A first leg portion of the biasing element 120 is engaged with the rider operating member 82, while a second leg portion of the biasing element 120 is engaged with the winding pawl 90 for biasing the winding pawl 90.

The rider operating member 82 is configured to perform multiple shifts in a single progress operating stroke of the rider operating member 82 in both the inner wire winding operation (i.e., when the rider operating member 82 is moved in the first rotational direction R3) and the inner wire releasing operation (i.e., when the rider operating member 82 is moved in the second rotational direction R4). In other words, the rider operating member 82 is movably mounted to a plurality of operating positions in a single progress operating stroke of the rider operating member 82 in both the rotational directions R3 and R4.

Referring to FIGS. 13 to 16, an inner wire winding operation will be briefly discussed. During movement of the rider operating member 82 in the first rotational direction R3 (i.e., an inner wire winding operation), the winding pawl 90 pulls the ratchet member 84 in the first rotational direction R3, while the positioning pawl 88 ratchets against the ratchet member 84. The positioning pawl 88 holds the ratchet member 84 in one of the ratchet positions depending on an amount of movement of the rider operating member 82. In other words, as the stroke of the rider operating member 82 in the first rotational direction R3 becomes the longer, the number of shifts that occur increases. For example, if the stroke of the rider operating member 82 in the first rotational direction R3 is small such that the ratchet member 84 is only moves a single shift position, then the positioning pawl 88 will hold the ratchet member 84 when the rider operating member 82 is released. This short stroke of the rider operating member 82 in the first rotational direction R3 will result in a single shift operation. However, if the stroke of the rider operating member 82 in the first rotational direction R3 is longer, then the ratchet member 84 will be moved multiple shift positions based on the stroke length of the rider operating member 82.

Turning now to the structure of the ratchet member 84. The ratchet member 84 is rotatably mounted with respect to the base member 80 about the pivot axis B. Preferably, as seen in FIG. 12, the ratchet member 84 is biased in the second rotational direction R4 by a biasing element 122 that is operatively disposed between the wire takeup member 86 and the upper support plate 94. In particular, since the ratchet member 84 and the wire takeup member 86 are coupled together to rotate as a unit, the biasing force of the biasing element 122 is transmitted from the wire takeup member 86 to the ratchet member 84. The biasing element 122 has a first end disposed in a hole 94a in the upper support plate 94 and a second end disposed in a hole 86a in the wire takeup member 86. The biasing element 122 is preloaded to urge the ratchet member 84 and the wire takeup member 86 in the second rotational direction R4.

Figure 14:
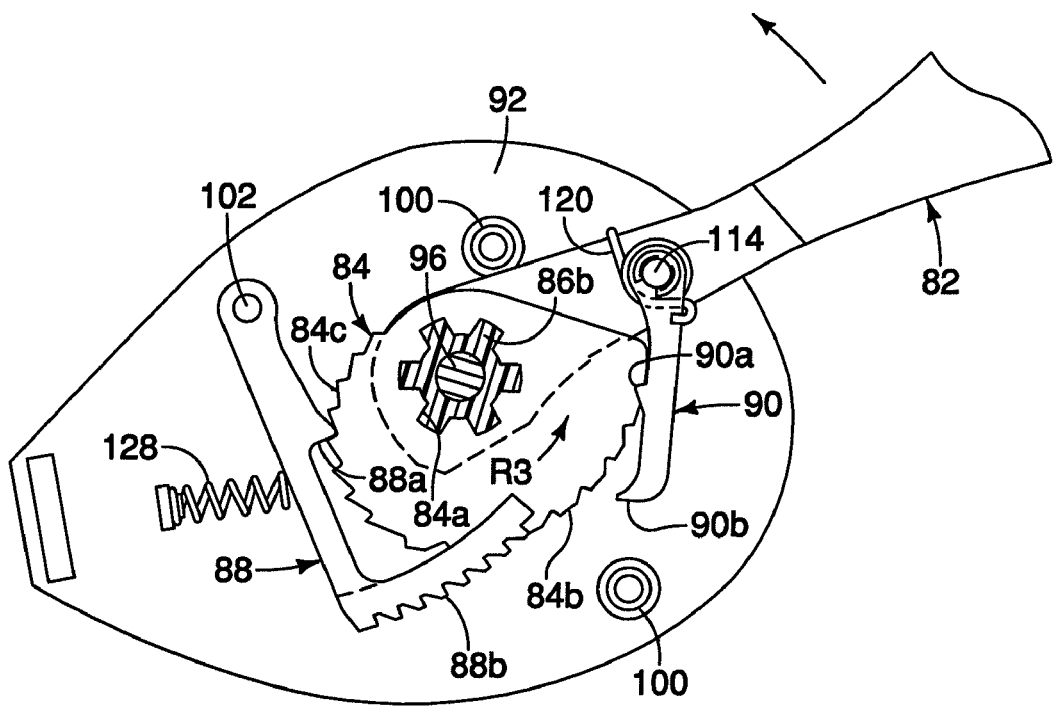
FIG. 14 is a top plan view of selected parts of the rear hand shifter with the rider operating member rotated to the end stroke position to perform an inner wire winding operation that results multiple (three) shifts occurring in a single progressive movement of the rider operating member.
Figure 15:
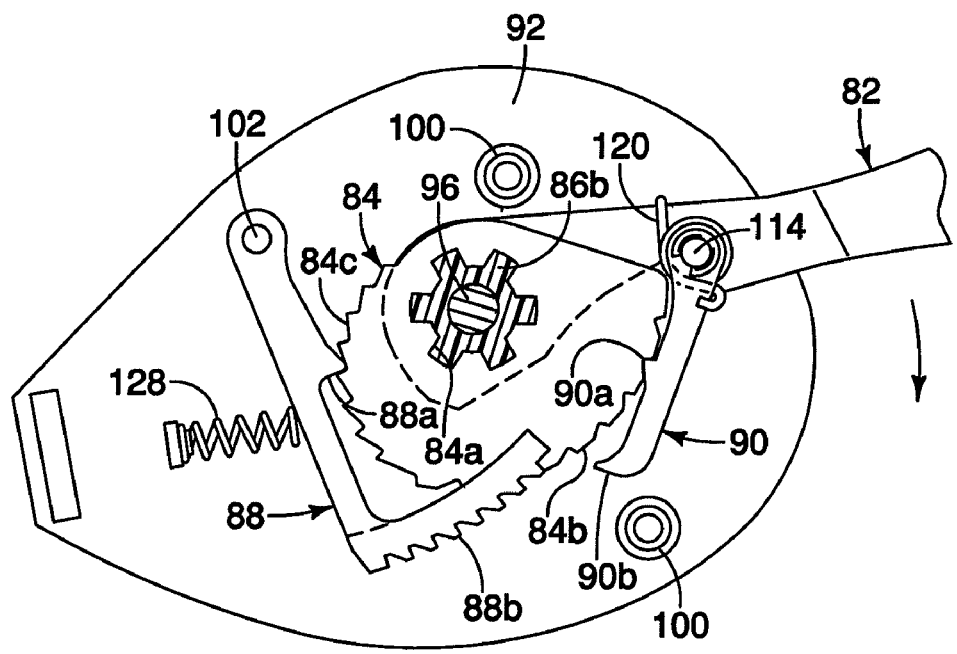
FIG. 15 is a top plan view of selected parts of the rear hand shifter with the rider operating member returning from the end stroke position illustrated in FIG. 14 after performing an inner wire winding operation such that the ratchet member is in the second shift position.

In the illustrated embodiment, the ratchet member 84 includes a mounting hole 84a, a plurality of winding abutments 84b and a plurality of positioning abutments 84c. The mounting hole 84a is a non-circular hole that mates with a corresponding projection 86b of the wire takeup member 86 so that the ratchet member 84 and the wire takeup member 86 move together as a unit. The winding abutments 84b are engaged by the winding pawl 90 for rotating the ratchet member 84 in the first rotational direction R3 (i.e., the inner wire winding direction) about the pivot axis B, as seen in FIGS. 14 and 15. The positioning abutments 84c are engaged by the positioning pawl 88 to hold the ratchet member 84 in a selected shift, as seen in FIGS. 13, 16, 18 and 20.

In the illustrated embodiment, the winding abutments 84b and the positioning abutments 84c are formed on the peripheral edge of the ratchet member 84. The winding abutments 84b and the positioning abutment 84c face in the same rotational directions with respect to the pivot axis B. The winding abutments 84b are disposed at different peripheral locations on the peripheral edge of the ratchet member 84. The winding abutments 84b are spaced approximately equal radial positions (distances) from the pivot axis B of the ratchet member 84. The positioning abutments 84c are disposed at different peripheral locations on the peripheral edge of the ratchet member 84. In particular, the positioning abutments 84c are progressively disposed farther from the pivot axis B of the ratchet member 84 in a stair-shaped configuration as the positioning abutments 84c progress in the first rotational direction R3 (the inner wire winding direction). The positioning abutments 84c are disposed at different radial positions (distances) with respect to the pivot axis B of the ratchet member 84. The winding abutments 84b and the positioning abutments 84c correspond to a plurality of ratchet positions of the ratchet member 84.

Turning now to the structure of the wire takeup member 86 as seen in FIG. 12. The wire takeup member 86 is a hard plastic member that is attached to the inner wire 20a of the shift operating cable 20 for pull and releasing the inner wire 20a to perform a shifting operation. The wire takeup member 86 has a wire attachment structure 86c for attaching the nipple portion 20c of the shift operating cable 20 thereto. The wire takeup member 86 is fixedly coupled to the ratchet member 84 so that the ratchet member 84 and the wire takeup member 86 move together about the pivot axis B. In particular, as mentioned above, the projection 86b of the wire takeup member 86 mates with the mounting hole 84a (see FIGS. 13 to 20) so that the ratchet member 84 and the wire takeup member 86 move together as a unit. Thus, as the wire takeup member 86 rotates the inner wire 20a of the shift operating cable 20 is wound or unwound on the peripheral edge of the wire takeup member 86.

Turning now to the structure of the positioning pawl 88. As mentioned above, the positioning pawl 88 is pivotally mounted on the pivot pin 102 of the lower support plate 92. Thus, the positioning pawl 88 is pivotally mounted with respect to the base member 80 about a pivot axis that is offset from the pivot axis B of the ratchet member 84. As seen in FIGS. 16 to 20, the positioning pawl 88 is movably mounted with respect to the base member 80 from a holding position (FIGS. 16, 18 and 20) to a releasing position (FIGS. 17 and 19) in response to an inner wire releasing operation of the rider operating member 82. A compression spring 128 is disposed between a tab of the lower support 92 and the positioning pawl 88 for biasing the positioning pawl 88 against the peripheral edge of the ratchet member 84.

The positioning pawl 88 has a positioning tooth or abutment 88*a* that engages the positioning abutments 84*c* of the ratchet member 84 to hold the ratchet member 84 in the selected shift position. The positioning tooth 88*a* of the positioning pawl 88 prevents rotation of the ratchet member 84 in the second rotational direction R4 (i.e., the inner wire releasing direction) about the pivot axis B when the positioning tooth 88*a* of the positioning pawl 88 engages one of the positioning abutments 84*c* of the ratchet member 84 (i.e., the positioning pawl 88 is in the holding position). The positioning pawl 88 releases the ratchet member 84 for rotation in the second rotational direction R4 (i.e., the inner wire releasing direction) when the positioning tooth 88*a* of the positioning pawl 88 is disengaged from the positioning abutments 84*c* of the ratchet member 84 (i.e., the positioning pawl 88 is in the releasing position) as explained below.

The positioning pawl 88 also has a plurality of engagement abutments 88*b* that are contacted by the winding pawl 90 in response to an inner wire releasing operation of the rider operating member 82 such that the positioning pawl 88 and the winding pawl 90 both move radially outward relative to the pivot axis B. In this way, the positioning tooth 88*a* of the positioning pawl 88 is disengaged the positioning abutments 84*c* of the ratchet member 84 and the winding pawl 90 moves out of an engagement path of the winding abutments 84*b* of the ratchet member 84 during the inner wire releasing operation.

Figure 16:
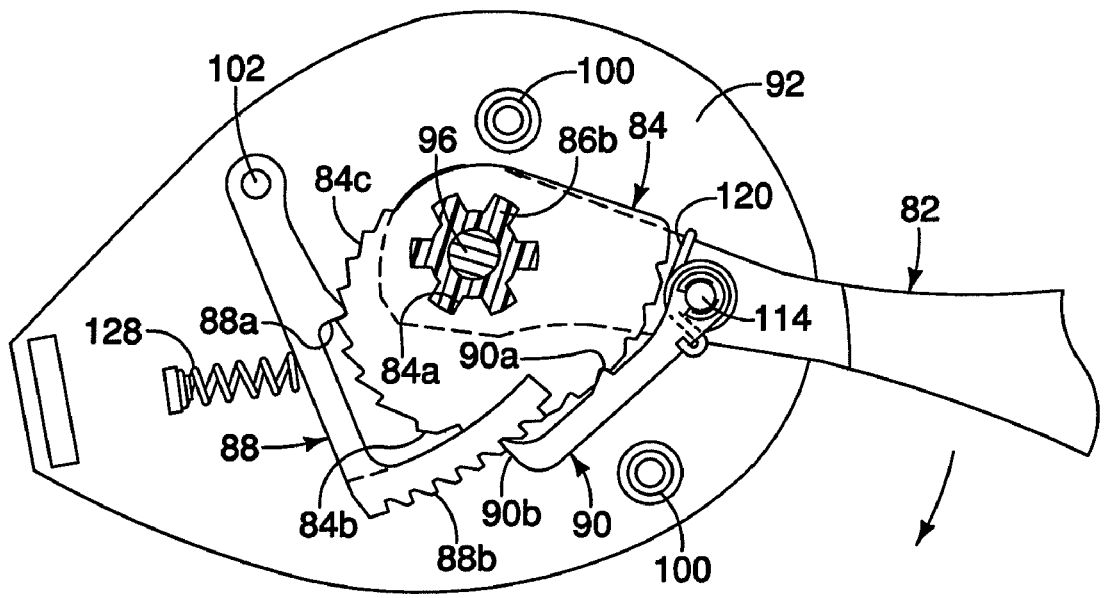
FIG. 16 is a top plan view of selected parts of the rear hand shifter with the rider operating member in the rest position and the ratchet member being held in the fifth shift position by the positioning pawl.
Figure 17:
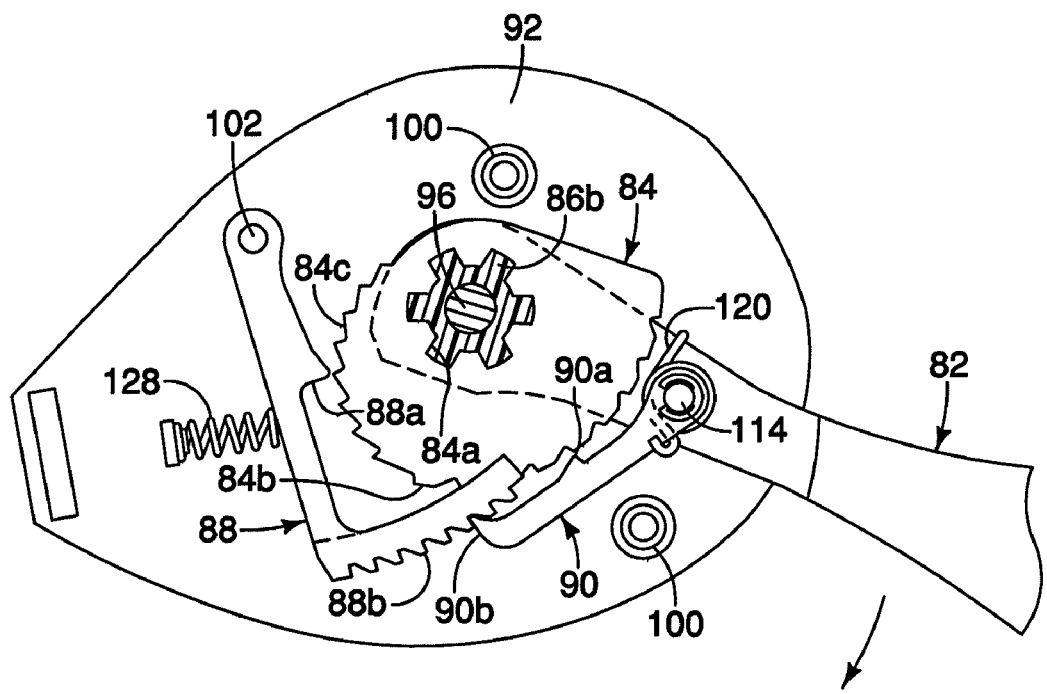
FIG. 17 is a top plan view of selected parts of the rear hand shifter with the rider operating member rotated to perform an inner wire releasing operation that results in a single shift occurring in a single progressive movement of the rider operating member.
Figure 18:
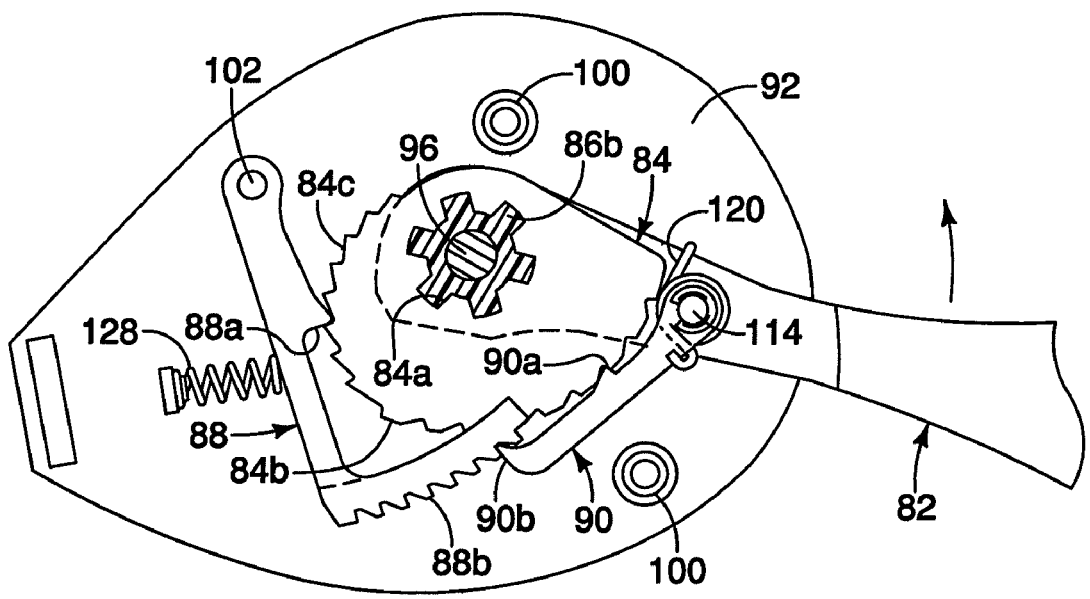
FIG. 18 is a top plan view of selected parts of the rear hand shifter with the rider operating member in the rest position and the ratchet member being held in the fourth shift position by the positioning pawl.
Figure 19:
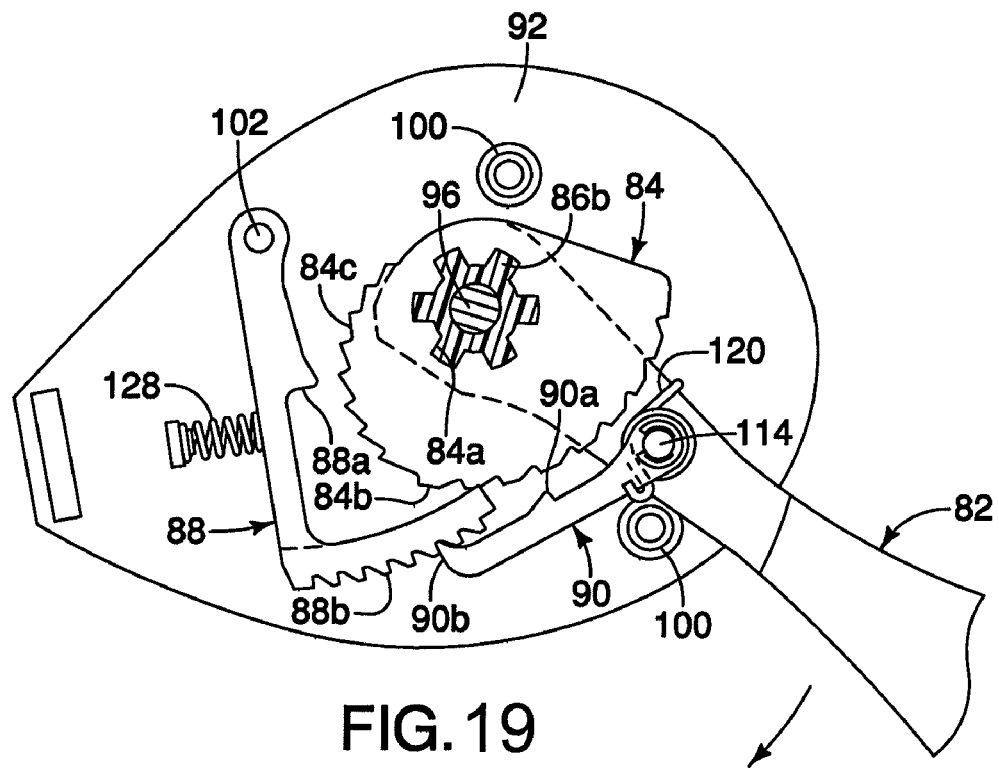
FIG. 19 is a top plan view of selected parts of the rear hand shifter with the rider operating member rotated to perform an inner wire releasing operation that results in two shifts occurring in a single progressive movement of the rider operating member.

Referring to FIGS. 16 to 20, two inner wire releasing operations are illustrated, and will be briefly discussed. During movement of the rider operating member 82 in the second rotational direction R4 (i.e., an inner wire releasing operation), the rider can selectively release the ratchet member 84 one or two ratchet or shift positions depending on an amount of movement of the rider operating member 82. In other words, the positioning pawl 88 releases the ratchet member 84 in the second rotational direction R4 (i.e., an inner wire releasing operation) by different rotational amounts (different ratchet positions) corresponding to the operating positions of the rider operating member 82, movably mounted to a plurality of operating positions in a single progress operating stroke of the rider operating member 82. For example, as shown in FIGS. 17 and 19, the rider operating member 82 can move the positioning pawl 88 either a first radial distance (FIG. 17) from the pivot axis B of the ratchet member 84 for shifting a single shift position or a second radial distance (FIG. 19) from the pivot axis B of the ratchet member 84 for shifting two shift positions with a single progressive movement of the rider operating member 82 from the rest position. Here, the second radial distance is greater than the first radial distance. In particular, if the rider operating member 82 is moved with respect to the base member 80 to a first operating position by a first operating amount as shown in FIG. 17, then the positioning pawl 88 is moved the first radial distance from the pivot axis B of the ratchet member 84. This movement of the positioning pawl 88 releases the ratchet member 84 such that the ratchet member 84 rotates a first release amount (one shift or ratchet position) in the second rotational (releasing) direction R4 in response to the releasing operation of the rider operating member 82 to the first operating position as seen in FIG. 17. In other words, in FIG. 17, the positioning tooth 88*a* of the positioning pawl 88 is disengaged from the positioning abutments 84*c* of the ratchet member 84 by a first radial distance from the pivot axis B of the ratchet member 84, which allows the ratchet member 84 to rotate until the next immediately adjacent one of the positioning abutments 84*c* of the ratchet member 84 is engaged by the positioning tooth 88*a* of the positioning pawl 88. If the rider operating member 82 is moved with respect to the base member 80 to a second operating position by a second operating amount as shown in FIG. 19, then the positioning pawl 88 is moved the second radial distance from the pivot axis B of the ratchet member 84. This movement of the positioning pawl 88 releases the ratchet member 84 such that the ratchet member 84 rotates a second release amount (two shift or ratchet positions) in the second rotational (releasing) direction R4 in response to the releasing operation of the rider operating member 82 to the second operating position as seen in FIG. 19. In other words, in FIG. 19, the positioning tooth 88*a* of the positioning pawl 88 is disengaged from the positioning abutments 84*c* of the ratchet member 84 by a second radial distance from the pivot axis B of the ratchet member 84, which allows the ratchet member 84 to rotate until the positioning abutments 84*c* of the ratchet member 84 that is two abutments away from the previously engaged abutment is engaged by the positioning tooth 88*a* of the positioning pawl 88. Accordingly, the positioning pawl 88 holds the ratchet member 84 in one of the ratchet positions depending on an amount of movement of the rider operating member 82.

Turning now to the structure of the winding pawl 90. As mentioned above, the winding pawl 90 is pivotally mounted on the pivot pin 114 of the rider operating member 82. Thus, the winding pawl 90 is pivotally mounted with respect to the base member 80 about a pivot axis that is offset from the pivot axis B of the ratchet member 84. As mentioned above, the biasing element 120 biases the winding pawl 90 into contact with the winding abutments 84*b* of the ratchet member 84. The winding pawl 90 has a winding abutment or tooth 90*a* and an engagement abutment 90*b*. The winding tooth 90*a* engages one of the winding abutments 84*b* of the ratchet member 84 to rotate the ratchet member 84 in the first rotational direction R3 (i.e., an inner wire winding direction) about the pivot axis B when the winding pawl 90 is moved with respect to the base member 80 in response to an inner wire winding operation of the rider operating member 82. The engagement abutment 90*b* engages one of the engagement abutments 88*b* of the positioning pawl 88 to release the ratchet member 84 during an inner wire releasing operation of the rider operating member 82. This contact between the engagement abutment 90*b* of the winding pawl 90 and one of the engagement abutments 88*b* of the positioning pawl 88 moves the positioning pawl 88 radially outward relative to the pivot axis B as the winding pawl 90 also moves radially outward relative to the pivot axis B in response to an inner wire releasing operation of the rider operating member 82. Also this contact between the engagement abutment 90*b* of the winding pawl 90 and one of the engagement abutments 88*b* of the positioning pawl 88 disengages the positioning tooth 88*a* of the positioning pawl 88 from the positioning abutment 84*c* of the ratchet member 84 to perform the releasing operation when the rider operating member 82 is moved in the second rotational direction R4. In other words, once the positioning tooth 88*a* of the positioning pawl 88 is disengaged from the positioning abutments 84*c* of the ratchet member 84, the urging force of the biasing element 122 rotates the ratchet member 84 in the second rotational direction R4.

Referring to FIGS. 13 to 16, an inner wire winding operation is illustrated. When the rider operating member 82 is moved in the first rotational direction R3 (i.e., an inner wire winding direction) to perform an inner wire winding operation, as seen in FIGS. 13 to 16, the winding tooth 90*a* of the winding pawl 90 engages one of the winding abutments 84*b* of the ratchet member 84 to rotate the ratchet member 84 in the first rotational direction R3. During this inner wire winding operation, as seen in FIGS. 13 to 16, the positioning tooth 88a of the positioning pawl 88 ratchets along the positioning abutment 84c of the ratchet member 84. The rider operating member 82 is trigger type lever such that it is biased to the rest positions (FIGS. 13, 16, 18 and 20) by the return springs 110 when the rider operating member 82 is released.

Figure 20:
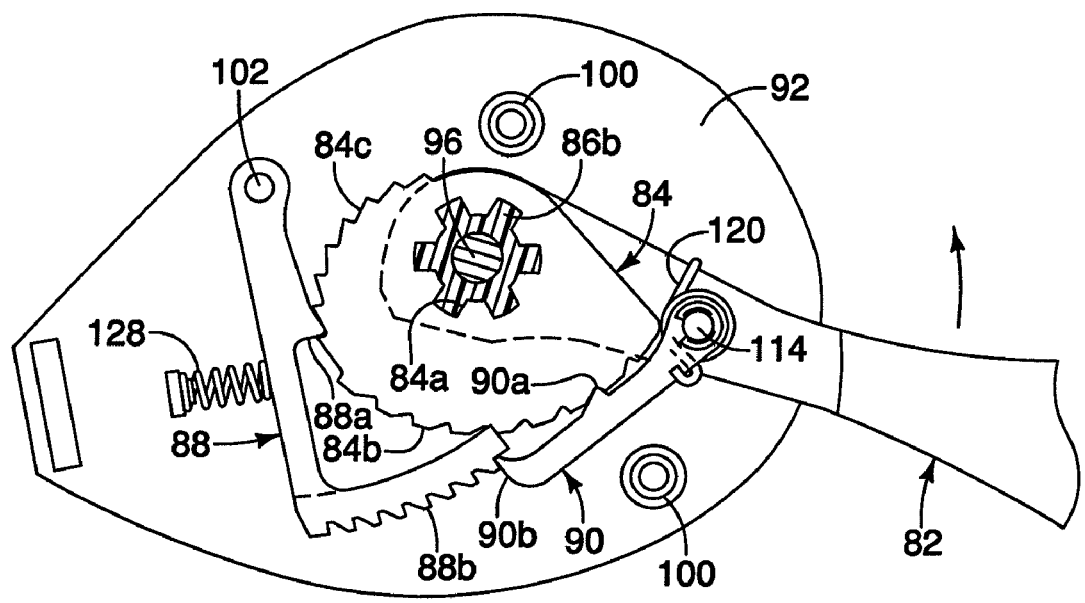
FIG. 20 is a top plan view of selected parts of the rear hand shifter with the rider operating member in the rest position and the ratchet member being held in the second shift position by the positioning pawl.

Referring to FIGS. 16 to 18, an inner wire releasing operation is illustrated. Here, in FIG. 16, the rider operating member 82 is in the rest position with the ratchet member 84 in the fourth shift position. When the rider operating member 82 is pivoted in the second rotational direction R4 from the rest position, as seen in FIG. 16, to a first intermediate stroke position of the rider operating member 82, as seen in FIG. 17, the engagement abutment 90b of the winding pawl 90 engages one of the engagement abutments 88b of the positioning pawl 88 to release the ratchet member 84 during the inner wire releasing operation of the rider operating member 82. When the winding pawl 90 and the positioning pawl 88 are moved to the first intermediate stroke position, both the winding pawl 90 and the positioning pawl 88 are moved radially outward with respect to the pivot axis B as shown in FIG. 17. Thus, in this first intermediate stroke position, the winding tooth 90a disengages from the winding abutments 84b of the ratchet member 84 and the positioning tooth 88a of the positioning pawl 88 disengages from the positioning abutment 84c of the ratchet member 84 to allow the ratchet member 84 to rotate in the second rotational direction R4. As mentioned above, the rider operating member 82 can be moved farther in the second rotational direction R4, past the first intermediate stroke position (FIG. 17) to a second intermediate stroke position (FIG. 19) to perform a multiple (two) shifting operation (FIG. 20). Now, when the rider operating member 82 is released after performing this inner wire releasing operation, the rider operating member 82 returns to the rest position, as seen in FIG. 13.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
a base member;
a rider operating member movably mounted with respect to the base member;
a ratchet member rotatably mounted with respect to the base member about a pivot axis;
a positioning pawl movably mounted with respect to the base member between a holding position and a releasing position, with the positioning pawl preventing rotation of the ratchet member in a releasing direction about the pivot axis when the positioning pawl is in the holding position, and the positioning pawl releasing the ratchet member for rotation in the releasing direction when the positioning pawl is in the releasing position; and
a winding pawl movably mounted with respect to the base member, the winding pawl having an abutment that engages the ratchet member fir rotating the ratchet member in a winding direction that is opposite to the releasing direction about the pivot axis when the winding pawl is moved with respect to the base member in response to a winding operation of the rider operating member,
the winding pawl contacting the positioning pawl and moving the positioning pawl radially outward relative to the pivot axis as the abutment of the winding pawl moves radially outward relative to the pivot axis in response to a releasing operation of the rider operating member.

2. The bicycle component operating device according to claim 1, wherein
the rider operating member is pivotally mounted with respect to the base member about the pivot axis of the ratchet member.

3. The bicycle component operating device according to claim 1, wherein
the positioning pawl is pivotally mounted with respect to the base member about a pivot axis that is offset from the pivot axis of the ratchet member.

4. The bicycle component operating device according to claim 1, wherein
the winding pawl is pivotally mounted on the rider operating member.

5. The bicycle component operating device according to claim 4, wherein
the rider operating member is pivotally mounted with respect to the base member about the pivot axis of the ratchet member.

6. The bicycle component operating device according to claim 5, wherein the positioning pawl is pivotally mounted with respect to the base member about a pivot axis that is offset from the pivot axis of the ratchet member.

7. The bicycle component operating device according to claim 1, wherein
the ratchet member includes at least one positioning abutment that is engaged by the positioning pawl when the positioning pawl is in the holding position and at least one winding abutment that is engaged by the winding pawl during the winding operation.

8. The bicycle component operating device according to claim 7, wherein
the positioning pawl engages the positioning abutment and the winding pawl engages the winding abutment on a same single plane along which the positioning abutment and the winding abutment lie.

9. The bicycle component operating device according to claim 1, wherein
the positioning pawl contacts the winding pawl and moves the winding pawl radially inward relative to the pivot axis in response to the winding operation of the rider operating member.

10. The bicycle component operating device according to claim 1, wherein
the winding pawl contacts the positioning pawl and moves the positioning pawl out of engagement from the ratchet member to perform the releasing operation when the rider operating member is moved in the winding direction.

11. The bicycle component operating device according to claim 1, wherein
the positioning pawl contacts the winding pawl and moves the winding pawl out of engagement with the ratchet member to perform the releasing operation when the rider operating member is moved in the winding direction.

12. The bicycle component operating device according to claim 1, wherein
the rider operating member is pivotally mounted with respect to the base member to move in a first rotational direction to perform the releasing operation, and
the rider operating member is pivotally mounted with respect to the base member to move in a second rotational direction, which is opposite the first rotational direction to perform the winding operation.

13. The bicycle component operating device according to claim 1, wherein
the rider operating member is movably mounted with respect to the base member to a first operating position, and moves the positioning pawl to a first radial distance from the pivot axis of the ratchet member to release the ratchet member such that the ratchet member rotates a first release amount in the releasing direction in response to the releasing operation of the rider operating member to the first operating position.

14. The bicycle component operating device according to claim 13, wherein
the rider operating member is movably mounted with respect to the base member to a second operating position past the first operating position in a single progress operating stroke of the rider operating member, and moves the positioning pawl to a second radial distance from the pivot axis of the ratchet member that is greater than the first radial distance to release the ratchet member such that the ratchet member rotates a second release amount in the releasing direction that is greater than the first release amount in response to the releasing operation of the rider operating member to the second operating position.

15. The bicycle component operating device according to claim 1, wherein
the rider operating member is movably mounted to a plurality of operating positions in a single progress operating stroke of the rider operating member with the positioning pawl releasing the ratchet member in the releasing direction by different rotational amounts to a plurality of ratchet positions corresponding to the operating positions of the rider operating member and the positioning pawl holding the ratchet member in one of the ratchet positions depending on an amount of movement of the rider operating member.

16. The bicycle component operating device according to claim 1, wherein the rider operating member is movably mounted to a plurality of operating positions in a single progress operating stroke of the rider operating member with the winding pawl rotating the ratchet member in the winding direction by different rotational amounts to a plurality of ratchet positions corresponding to the operating positions of the rider operating member and the positioning pawl holding the ratchet member in one of the ratchet positions depending on an amount of movement of the rider operating member.

17. The bicycle component operating device according to claim 1, wherein
the ratchet member includes a plurality of positioning abutments corresponding to a plurality of ratchet positions, with the positioning abutments being disposed at different radial positions with respect to the pivot axis of the ratchet member.

18. The bicycle component operating device according to claim 17, wherein
the positioning abutments are progressively disposed farther from the pivot axis of the ratchet member in a stair-shape configuration as the positioning abutments progress in the winding direction.

19. The bicycle component operating device according to claim 18, wherein
the positioning pawl includes a plurality of engagement abutments that are selectively engaged by the winding pawl during the releasing operation of the rider operating member depending on which of the positioning abutments of the ratchet member is engaged with the positioning pawl just prior to the releasing operation of the rider operating member.

20. The bicycle component operating device according to claim 1, wherein
the ratchet member has a wire takeup member coupled to the ratchet member so that the ratchet member and the wire takeup member pivot together on the pivot axis.

21. The bicycle component operating device according to claim 1, wherein
the rider operating member is configured to pivot on the same pivot axis during the winding operation and the releasing operation.

22. The bicycle component operating device according to claim 1, wherein
the winding pawl is engaged with the ratchet member at a rest position of the rider operating member.

* * * * *